United States Patent
Yoshida

(10) Patent No.: US 6,211,899 B1
(45) Date of Patent: Apr. 3, 2001

(54) IMAGE EXPOSURE APPARATUS

(75) Inventor: Futoshi Yoshida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/081,996

(22) Filed: May 21, 1998

(30) Foreign Application Priority Data

Sep. 1, 1997 (JP) .................................................. 9-236166

(51) Int. Cl.[7] ........................................................ G01D 9/42
(52) U.S. Cl. ............................................ 347/250; 347/235
(58) Field of Search ..................................... 347/234, 235, 347/250

(56) References Cited

U.S. PATENT DOCUMENTS

| | | | |
|---|---|---|---|
| 4,895,826 | 1/1990 | Watanabe et al. | 503/202 |
| 5,450,121 | * 9/1995 | Adams | 347/250 |
| 5,648,809 | * 7/1997 | Kato et al. | 347/250 |

FOREIGN PATENT DOCUMENTS

| | | | |
|---|---|---|---|
| 0 323 887 | 7/1989 | (EP) | G03C/1/52 |
| 2 181 564 | 4/1987 | (GB) | B41M/5/12 |

* cited by examiner

Primary Examiner—Huan Tran
(74) Attorney, Agent, or Firm—Sughrue, Mion, Zinn, Macpeak & Seas, PLLC

(57) ABSTRACT

A photodiode is positioned outside an image recording region and receives light from a light source portion prior to image recording processing. When the photodiode detects light at the time of the first main scan, the pulse number of a stepping motor is reset, 0, and thereafter, the pulse number is used to control the driving of the stepping motor. For this reason, an output timing of an image signal in the second and subsequent main scan operations does not depend on the detection of light by the photodiode and allows output of an image signal at a predetermined pulse number. The scan operation based on the control of the pulse number is effected for each image, and at the scan start time of a subsequent image, the pulse number is reset again when light is detected by the photodiode. Accordingly, it is possible to eliminate inconsistency of the start time of each main scan, which is caused by a variation in the time of detection by a sensor for controlling a scan start timing.

18 Claims, 9 Drawing Sheets

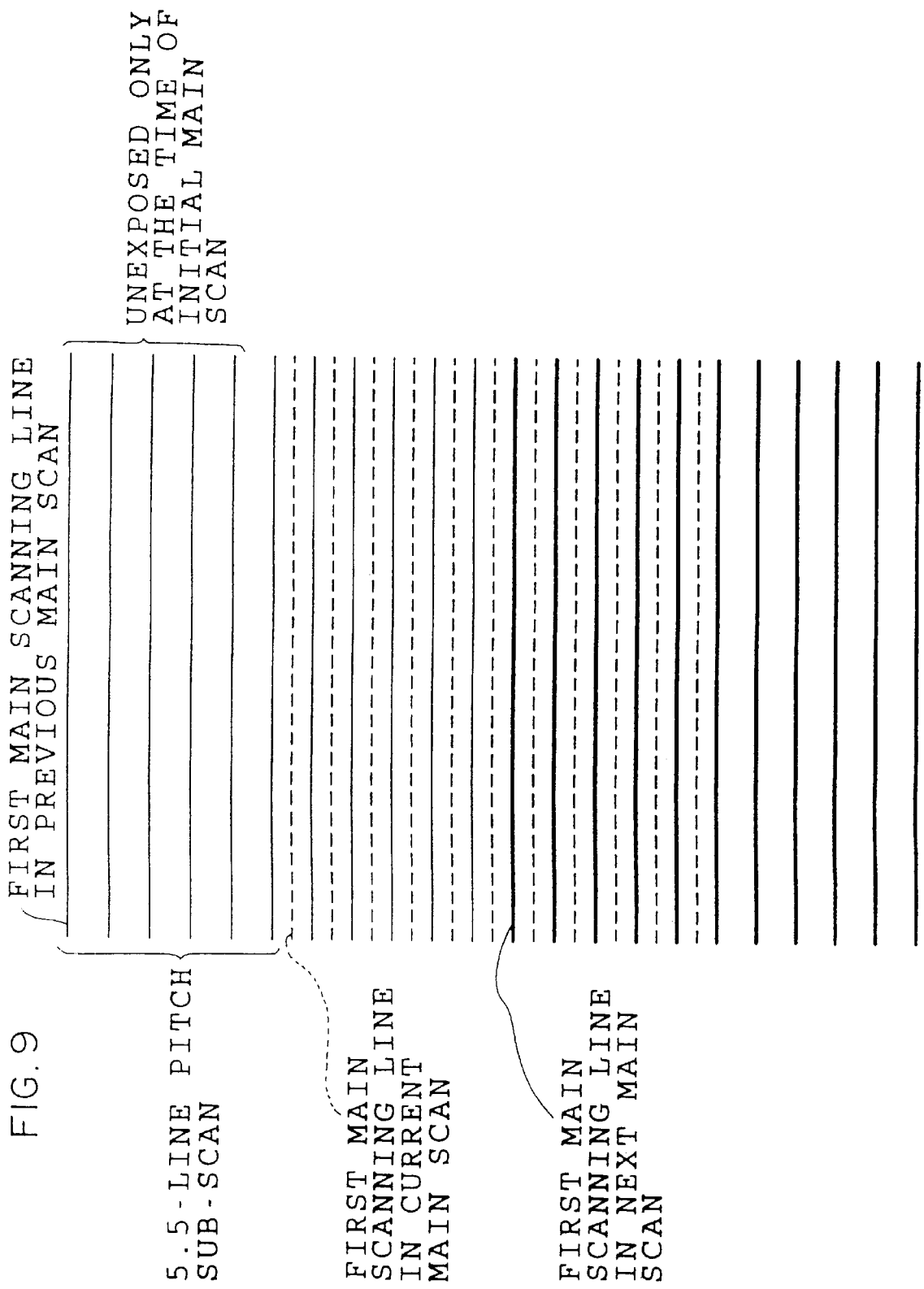

IMAGE EXPOSURE APPARATUS

BACKGROUND OF THE INVENTION

1. Field of the Invention

The present invention relates to an image exposure apparatus in which an image is exposed onto a photosensitive material based on image data in such a manner that main scan and sub-scan are effected for the photosensitive material by a light source unit.

2. Description of the Related Art

Currently, a number of image exposure apparatuses each having a digital exposure system mounted thereon have been developed. Generally, in the digital exposure system, an image is recorded on a recording medium in such a manner that a light beam outputted from a semiconductor laser is modulated with image data and deflected by the high-speed rotation of a polygon mirror (main scan), and the light beam reflected by the polygon mirror is further subjected to sub-scanning by a galvano mirror or the like, or the above main scan is effected repeatedly while the recording medium is moved (or the recording medium is moved stepwise). Here, as the recording medium, a photosensitive drum electrified by corona discharge, or a photosensitive material may be used. Further, in place of the semiconductor laser, another light emitter such as a light emitting diode (LED) may be used as a light source.

In the above-described image exposure apparatus, it is necessary that the starting point of each main scanning line is aligned in the sub-scanning direction. For this reason, a sensor (which will be generally referred to as an SOS sensor) is provided within a widthwise range of main scan and at a position other than an image recording region, and at a predetermined time after light at the time of main scan is detected by the SOS sensor, an image data signal is outputted. As a result, the time when output of an image signal starts at each main scan becomes constant and distortion of an image, and the like can be prevented accordingly.

However, when the SOS sensor is used for the synchronization as described above, the time of detection by the sensor may not become constant. Namely, a detection surface of the sensor has a certain region, and the signal is not reversed unless a predetermined amount of light is detected in the certain region. For this reason, the time of the image signal outputted may change due to inconsistency of the reverse timing.

SUMMARY OF THE INVENTION

In view of the above-described circumstances, it is an object of the present invention to provide an image exposure apparatus which can solve inconsistency of a main scan start time caused by variation of time of detection by a sensor for controlling a scan start timing.

In accordance with a first aspect of the present invention, there is provided an image exposure apparatus which controls emission of a light beam from a light source based on an image data signal to record an image on a photosensitive material by scanning the light beam, comprising: main scan means which moves the light source with respect to the photosensitive material in a predetermined main scanning direction; sub-scan means which moves relatively the light source and the photosensitive material in a direction perpendicular to the main scanning direction for each main scan effected by the main scan means; a detecting sensor which detects a start position of the main scan means; moving amount detecting means which detects an amount by which the light source is moved in the main scanning direction; and main scan exposure control means which controls an exposure start timing of a light beam in each of the second and subsequent main scan operations until the first main scan operation for scan recording starts, with reference to a detected value of an amount of movement detected by the moving amount detecting means when the start position of the main scan means is detected by the detecting sensor.

A second aspect of the present invention is characterized by that, in the first aspect, the detecting sensor is a start-position detecting sensor which detects a light beam from the light source at a predetermined position.

A third aspect of the present invention is characterized by that, in the first aspect, the detecting sensor is a main scan means-initial position detecting sensor which detects the main scan means at a predetermined position.

In accordance with the first aspect of the present invention, only in the first main scan, the detecting sensor is used to start the main scan. In subsequent operations, the main scan is controlled based on the moving amount detection value which is detected by the moving amount detecting means, with the time detected by the detection sensor as a reference. For this reason, high-accurate image exposure processing can be effected without depending on variation in time for detection by the detecting sensor itself.

Further, detection of light is effected by the start-position detecting sensor only in the first main scan, and therefore, exposure for producing a high image quality can be achieved, for example, not only in one-way scan, but also in reciprocating scan. Usually, although the reciprocating scan allows high-speed processing unlike the one-way scan, the image quality may deteriorate due to misregistration of dot positions caused by reciprocation. However, with the control of the amount of movement according to the present invention, the deterioration of the image quality does not arise.

According to the second aspect of the present invention, the start-position detecting sensor is disposed, as the detecting sensor, on the locus of an optical path of light beam so as to directly detect the light beam, and the position of the light beam can thereby be detected with high accuracy.

Further, according to the third aspect of the present invention, the main scan means-initial position detecting sensor which detects the main scan means at a predetermined position may be used as the detecting sensor.

The main scan means-initial position detecting sensor has the same function as the start-position detecting sensor according to the second aspect and also has the same effects as those of the start-position detecting sensor.

However, the start-position detecting sensor according to the second aspect is used to detect light and the kind of the sensor is limited. However, at the predetermined position on the locus of a mechanical movement of the main scan means for allowing main scan of the light beam, there may be applicable various kinds of sensors, for example, not only a mechanical switch such as a limit switch, but also a photo-electric sensor having a light emitting portion and a light receiving portion, a sensor using a Hall element which outputs different signals due to variation in magnetic flux density, and the like.

Further, the degree of freedom of the position where the main scan means-initial position detecting sensor is mounted increases and this detecting sensor can be provided at an appropriate location taking account of assembling efficiency thereof.

A fourth aspect of the present invention is characterized by that, in the first aspect, the main scan driving is effected by a stepping motor and a driving pulse for the stepping motor or a pulse prior to dividing, which is inputted to a stepping motor driving pulse generator, is used to detect the amount of movement of the light source.

According to the fourth aspect of the present invention, by using, as the moving amount detection value, the driving pulse of the stepping motor or the pulse prior to dividing which is inputted to the stepping motor-driving pulse generator, the amount of movement can be detected with high accuracy. Further, a driving system (i.e., a stepping motor) which actually effects main scan is used commonly so as to reduce detection errors.

A fifth aspect of the present invention is characterized by that, in the fourth aspect of the present invention, an exposure start timing for one dot of an image is synchronized with a driving pulse for the stepping motor or n times or 1/n (n is an integer) the pulse prior to dividing.

According to the fifth aspect of the present invention, the detection errors can be reduced and the writing start position of each main scan can be determined with higher accuracy. For this reason, even in the case of reciprocating scan, a high-quality image can be obtained.

BRIEF DESCRIPTION OF THE DRAWINGS

FIG. 9 is a plan view which shows the state of main scanning lines when a light source portion according to the second embodiment of the present invention is applied.

DESCRIPTION OF THE PREFERRED EMBODIMENTS

Overall Structure (Exterior View)

Figure 1:
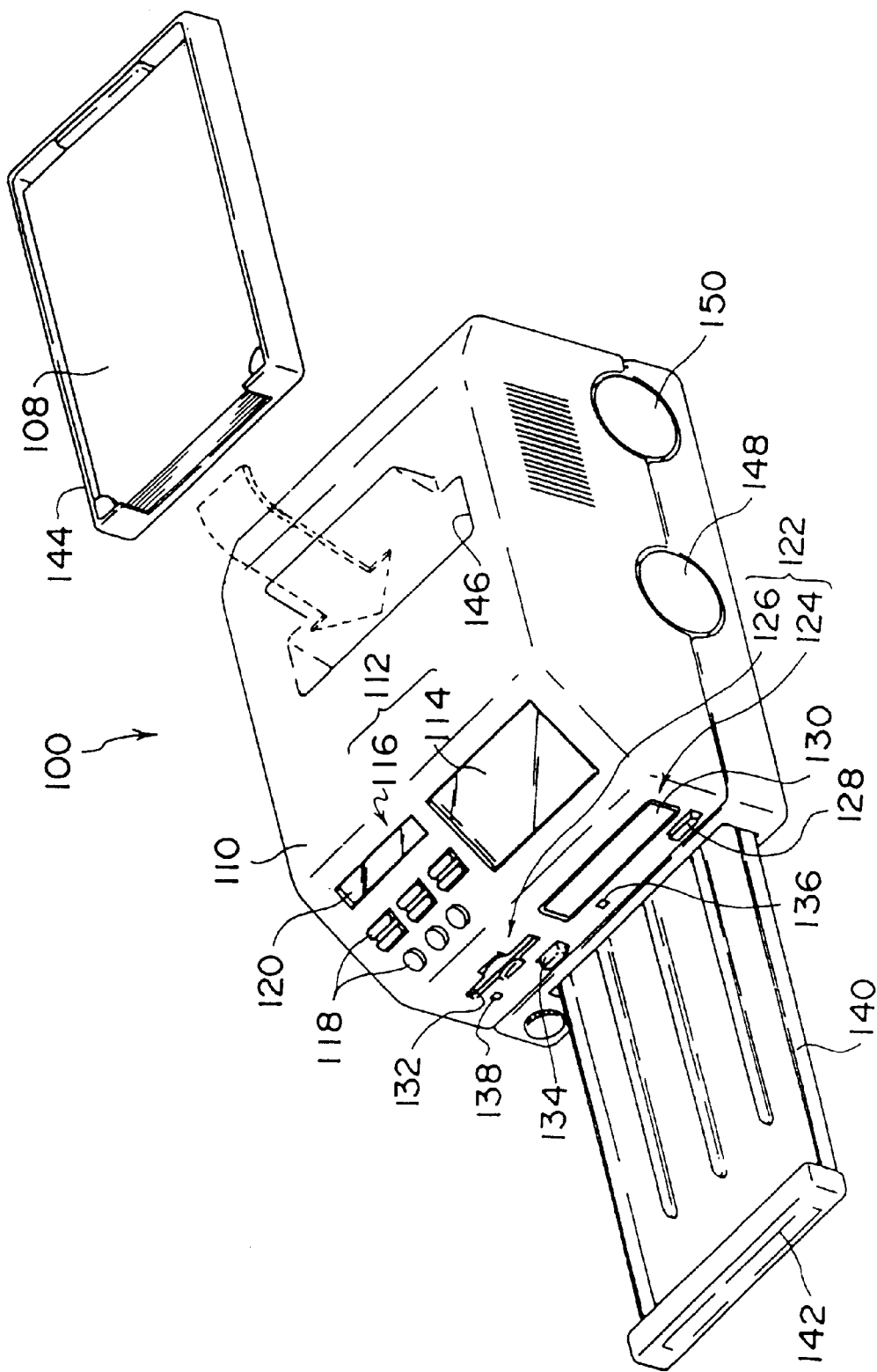
FIG. 1 is a perspective view of an image recording apparatus according to an embodiment of the present invention.
Figure 2:
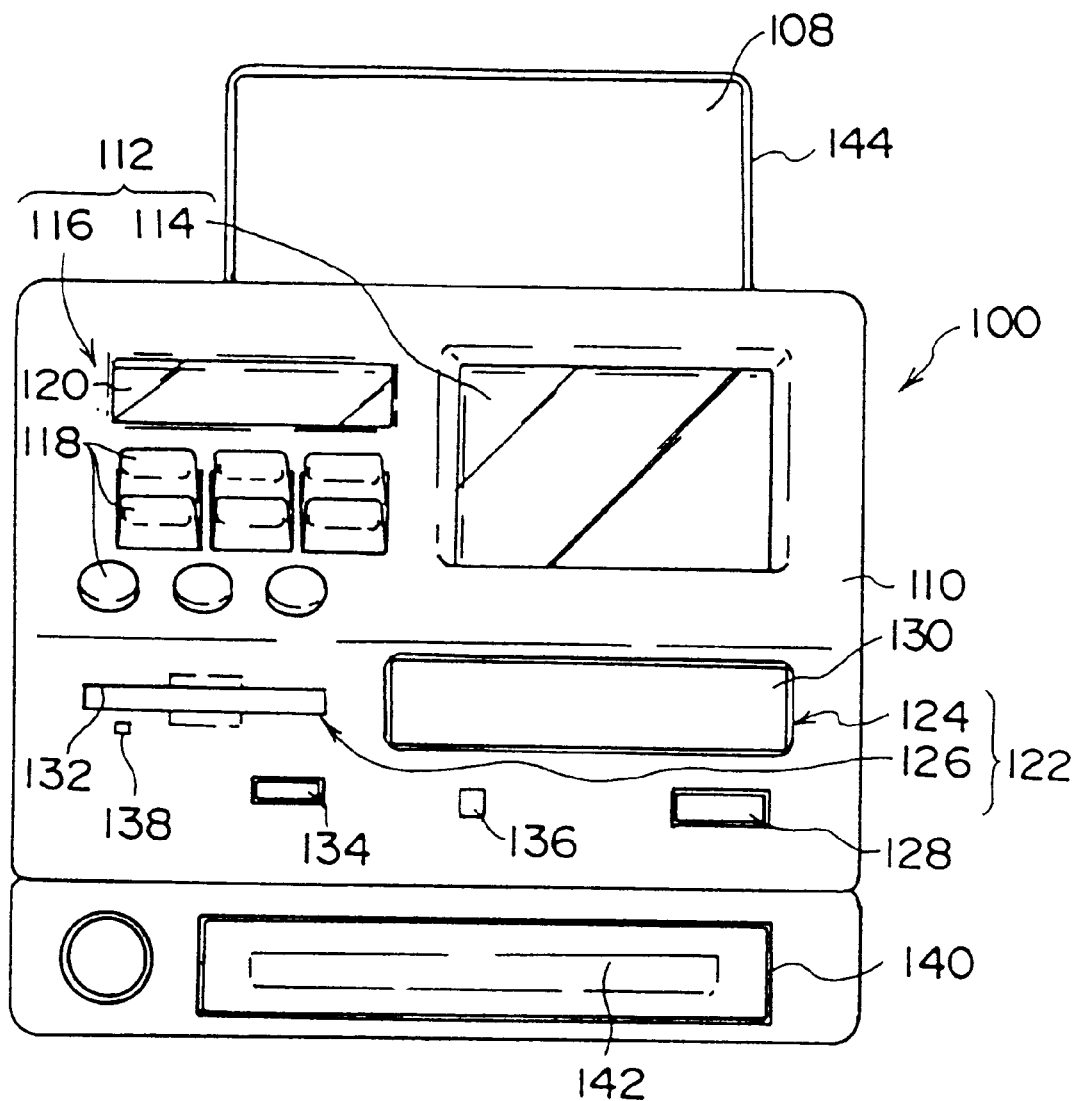
FIG. 2 is a front view of the image recording apparatus according to the embodiment of the present invention.
Figure 3:
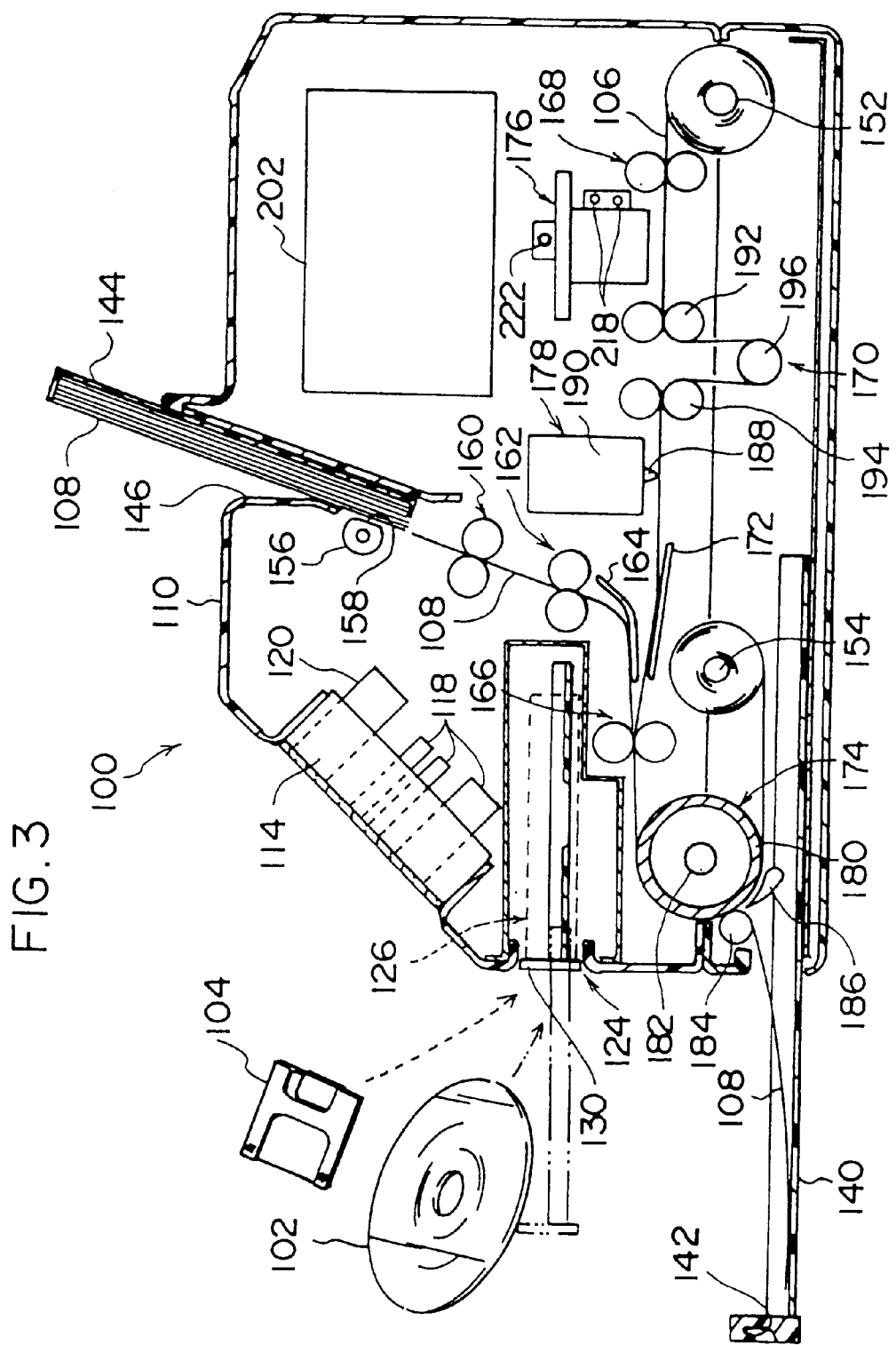
FIG. 3 is a cross-sectional side view which shows an internal structure of the image recording apparatus according to the embodiment of the present invention.

Referring now to FIGS. 1 through 3, there is shown an image recording apparatus 100 according to an embodiment of the present invention.

The image recording apparatus 100 reads image data recorded on a CD-ROM 102 or an FD 104 (which are both shown in FIG. 3) and outputs the data to expose onto a photosensitive material 106, and transfers an image recorded on the photosensitive material 106 to an image receiving paper 108.

An upper portion of the front surface of a box-shaped casing 110 (at the left side on the paper of FIG. 3) is formed as an inclined surface and an operation display portion 112 is provided thereon.

As shown in FIG. 2, the operation display portion 112 is divided into a monitor portion 114 and an input portion 116 which are disposed at right and left sides, respectively. The monitor portion 114 allows the read image to be displayed thereon.

Further, the input portion 116 includes a plurality of operation keys 118 and a display portion 120 for confirmation of input data and can input data which is required for image recording, for example, the number of sheets to be recorded, size setting, color-balance adjustment, and negative/positive selection.

A deck portion 122 is provided below the operation display portion 112. The deck portion 122 is formed by an optical disk deck portion 124 and an FD deck portion 126 which are disposed at right and left sides, respectively, of FIG. 2.

The optical disk deck portion 124 is provided in such a manner that a tray 130 can be opened and closed by pressing an open/close button 128. The optical disk 102 can be loaded in the interior of the apparatus by placing the optical disk 102 on the tray 130.

An FD insertion slot 132 is provided in the FD deck portion 126. When the FD 104 is inserted in the FD insertion slot 132, a driving system within the apparatus is actuated to allow pull-in of the FD 104. Further, in order to take out the FD 104 from the FD deck portion 126, an operation button 134 is pressed to take out the FD 104.

Further, access lamps 136 and 138 are respectively provided for the optical disk deck portion 124 and the FD deck portion 126 and are each provided to be turned on during access within the apparatus.

A discharge tray 140 is provided further below the deck portion 122. The discharge tray 140 is usually accommodated within the apparatus and is provided to be taken out by the finger of an operator being placed on a holding portion 142 (see FIG. 1).

The image receiving paper 108 on which the image is recorded is discharged onto the discharge tray 140.

The image receiving paper 108 is accommodated in advance on a tray 144 in layers. The tray 144 is loaded in a tray loading aperture 146 formed on an upper surface of the casing 110. The image receiving papers 108 are taken out one by one from the tray 144 loaded in the tray loading aperture 146, and after images are transferred onto the image receiving papers 108, these image receiving papers 108 are each guided to the discharge tray 140.

Two circular cover members 148 and 150 are attached to the right side surface of the casing 110 (toward the front side on the paper of FIG. 1). These cover members 148 and 150 are each provided so as to be independently removable. As shown in FIG. 3, a take-up reel 154 and a feed reel 152 onto which the rolled photosensitive material 106 is wound are disposed within the apparatus along the axial directions of the cover members 148 and 150, respectively. These reels 152 and 154 can be taken out from or loaded into the apparatus in a state in which the covers 148 and 150 are removed.

Image Receiving Paper Conveying System

As shown in FIG. 3, the tray 144 loaded in the tray loading aperture 146 is provided in such a way that an upper surface of the leading end of the tray (the side where the tray 144 is loaded in the tray loading aperture 146) faces a semicircular roller 156.

The semicircular roller 156 is formed by cutting a cylindrical roller along a plane parallel to an axis thereof. Usually, the cut surface 158 of the semicircular roller 156 faces an uppermost image receiving paper 108 within the tray 144 with a space formed therebetween. When the semicircular roller 156 rotates, the uppermost image receiving paper 108 and the peripheral surface of the semicircular roller 156 contact each other, and the image receiving paper 108 is pulled out by a small amount when the semicircular roller 156 makes one rotation. The pulled-out image receiving paper 108 is nipped by a first roller pair 160 and is completely pulled out from the tray 144 by the driving force of the first roller pair 160.

A second roller pair 162, a guide plate 164, and a third roller pair 166 are sequentially disposed on the downstream side of the first roller pair 160. After having been nipped by the first roller pair 160, the image receiving paper 108 is nipped by the second roller pair 162, guided by the guide plate 164, and further nipped by the third roller pair 166.

The image receiving paper 108 overlaps with the photosensitive material 106 at the third roller pair 166. Namely, the third roller pair 166 is also used as a conveying path of the photosensitive material 106.

Photosensitive Material Conveying System

The photosensitive material 106 is loaded in the apparatus in an elongated state and wound onto the feed reel 152 in a layered form. The feed reel 152 is loaded in a predetermined position in such a manner that the cover member 150 (at the rear side of the apparatus) is removed and the feed reel 152 is inserted into the apparatus in the axial direction thereof.

With the photosensitive material 106 being loaded in the predetermined position, the leading end of the photosensitive material is pulled out at the initial stage and loading of the photosensitive material 106 is effected along a predetermined conveying path. The loading sequence consists of the leading end of the photosensitive material 106 being pulled out from the feed reel 152, nipped by a fourth roller pair 168 in the vicinity of the feed reel 152, conveyed through a reservoir portion 170 and a guide plate 172, and nipped by the third roller pair 166, and thereafter, being entrained onto a heat roller 174 and a take-up reel 154 sequentially. In this case, a leader tape having a length required for loading may be provided at the leading end portion of the photosensitive material 106 wound onto the feed reel 152.

On the conveying path of the photosensitive material 106, an exposure section 176 is provided between the fourth roller pair 168 and the reservoir portion 170. Further, a water applying portion 178 is provided between the reservoir portion 170 and the guide plate 172. The exposure section 176 and the water applying portion 178 will be described later in detail. After the photosensitive material 106 has been exposed imagewisely in the exposure section 176, the photosensitive material 106 is laminated with the image receiving material 108 at the third roller pair 166 in a state in which the emulsion surface (i.e., the surface to be exposed) is wet from the application of water.

Heat Roller

The heat roller 174 serves as a heat development-transfer section of the apparatus and is formed by a cylindrical roller main body 180 and a heater 182 provided within the roller main body 180 along the axial direction of the roller main body. The heat roller 174 serves to apply heat to members wound onto the roller main body 180 (i.e., the photosensitive material 106 and the image receiving material 108) by heating the surface of the roller main body 180 through the operation of the heater 182. The heating of the heat roller 174 enables heat development-transfer processing and the image recorded on the photosensitive material 106 is thereby transferred onto the image receiving paper 108.

A peeling roller 184 and a peeling claw 186 are disposed at a lower right side and in the vicinity of the heat roller 174 and are provided to separate the image receiving paper 108, which has been wound onto the heat roller 174 by a length of about one third the overall circumference of the heat roller 174 from the photosensitive material 106, and to guide the image receiving paper 108 toward the discharge tray 140.

On the other hand, the photosensitive material 106 is wound onto the heat roller 174 by a length of about half the overall circumference of the heat roller and is turned in an opposite direction to be guided to a position where the take-up reel 154 is mounted.

Water Applying Portion

As shown in FIG. 3, the water applying portion 178 performs the task of a heat developer by imparting water, which serves as an image forming solvent, onto the photosensitive material 106 or the image receiving paper 108 to allow the laminating surfaces of the photosensitive material 106 and the image receiving paper 108 to closely adhere to each other. The water applying portion 178 is formed by an elongated applying member 188 extending along a transverse direction of the photosensitive material 106 and a tank 190 which is filled with water.

The applying member 188 is formed of a high water-absorptive material, for example, felt, sponge, or the like, having a suitable degree of hardness and is disposed so as to contact the photosensitive material 106 at a predetermined pressure during conveying of the photosensitive material 106. The water in the tank 190 is constantly supplied to the applying member 188 in a suitable quantity through capillary action. When the photosensitive material 106 and the applying member 188 contact each other, water is applied to the surface (i.e., the emulsion surface) of the photosensitive material 106 by the applying member 188.

Further, since the applying member 188 abuts against the photosensitive material 106 at an appropriate pressure, water is uniformly applied to the photosensitive material 106.

Replenishment of the water in the tank 190 is effected by removing the entire water applying portion 178 from the apparatus, but water may be constantly supplied from an exterior of the apparatus by using a pipe arrangement.

Moreover, in the present embodiment, water is used as the image forming solvent, but the water used in this embodiment is not limited to pure water and also includes water which is widely and generally used. Further, a mixed solvent of water and a low-boiling-point solvent such as methanol, DMF, acetone, diisobutylketone, or the like may be used. Moreover, a solution which contains an image formation accelerator, an anti-fogging agent, a development stopping agent, a hydrophilic heat solvent, or the like may also be used.

Exposure Section

Figure 4:
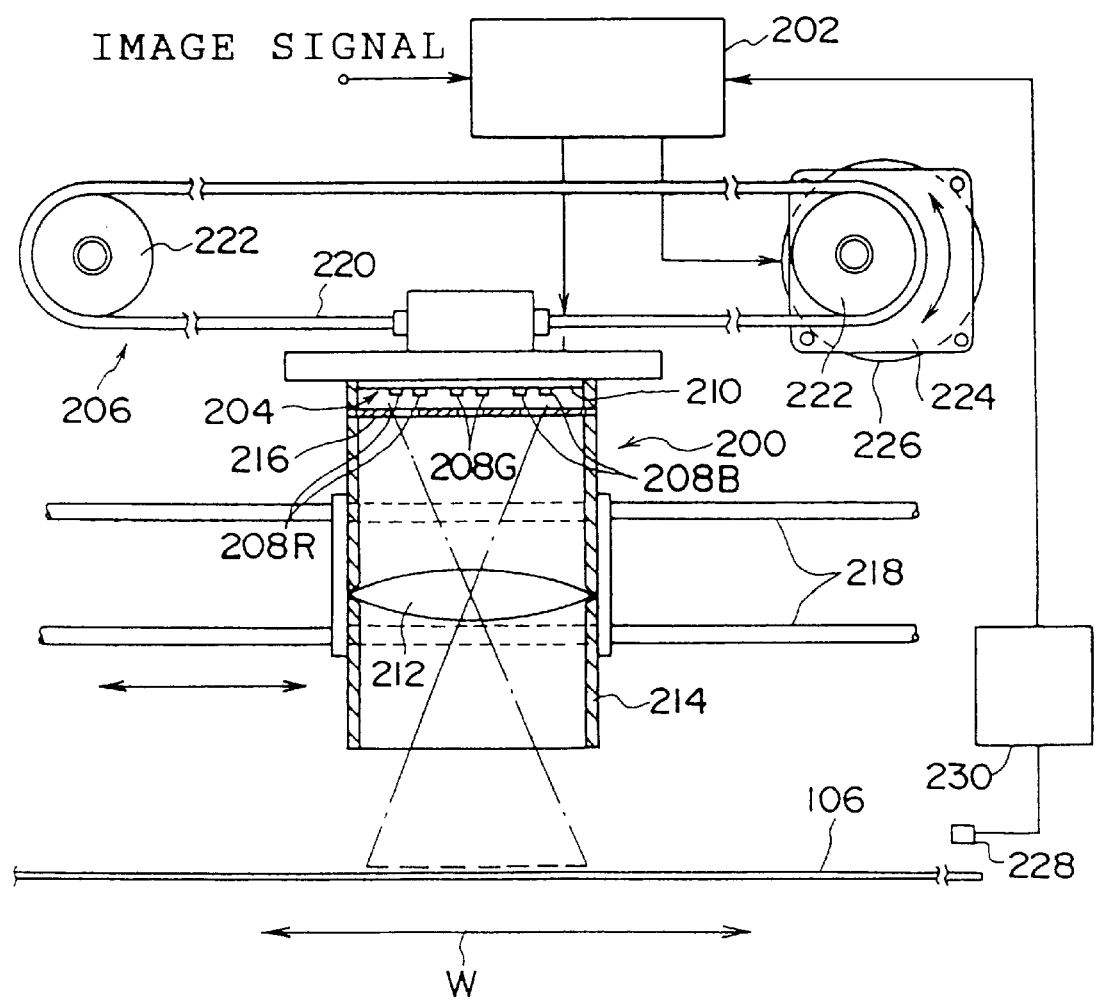
FIG. 4 is a schematic front view which shows a structure of an exposure section.

FIG. 4 shows an exposure section 176 according to the present embodiment.

The exposure section 176 is mainly formed from a light source unit 200 which is provided above the conveying path of the photosensitive material 106 and which is connected to a controller 202. An image signal (the image signal read from the optical disk 102 or FD 104) is stored in the controller 202 and a light source portion 204 within the light source unit 200 is turned on in accordance with the image signal. The light source unit 200 is provided so as to be movable in the transverse direction of the photosensitive material 106 (i.e., the main scanning direction) when driven by a main scan unit 206, which will be described later. The main scan is effected when the photosensitive material 106 stops during step driving in the exposure section 176.

The light source unit 200 of the exposure section 176 is covered by a box-shaped exposure casing 214. A light source portion 204 is disposed on the upper end surface of the exposure casing 214 and a light emission surface of the light source portion 204 is directed toward the interior of the exposure casing 214. An aperture 216 is provided on the side of the light emission surface of the light source portion 204 to limit spread of light from a plurality of LED chips 208. Meanwhile, the structure having no aperture 216 may also be used in the present invention.

A telecentric lens 212 is provided at the lower side of the aperture 216 and at the central portion of the exposure casing 214 and serves to converge light from the light source portion 204 to form an image on the photosensitive material 106. The resolution of light for image formation is about 250 to 400 dpi.

In this case, the telecentric lens 212 is formed by a plurality of lenses and an aperture and is characterized by the magnification thereof not varying even when the height of an image surface changes. The telecentric lens 212 can eliminate errors occurring during the main scan movement of the main scan unit 206, or generated by the state in which the LED chips 208 are mounted.

Further, the focus of the telecentric lens 212 is constantly adjusted by an automatic focusing mechanism (not shown). Alternatively, the telecentric lens 212 may also be formed as a lens system whose depth of focus is large so as to eliminate the need of adjustment of the focus.

The light source portion 204 is supported by a pair of guide shafts 218 disposed parallel to each other and forming a part of the main scan unit 206. These guide shafts 218 are provided along the transverse direction of the photosensitive material 106 (i.e., the direction indicated by arrow W in FIG. 4). The light source portion 204 is guided by the guide shafts 218 so as to be movable in the transverse direction of the photosensitive material 106.

A portion of an endless timing belt 220 is fixed at the exposure casing 214 of the light source portion 204. The timing belt 220 is entrained onto sprockets 222 positioned in the vicinities of both ends of the pair of guide shafts 218. The rotating shaft of one of the sprockets 222 is connected via a transmission 224 to the rotating shaft of a stepping motor 226. Due to the reciprocating rotation of the stepping motor 226, the light source portion 204 is moved along the guide shafts 218 in a reciprocating manner.

The driving of the stepping motor 226 is controlled by the controller 202 and is synchronized with the step driving of the photosensitive material 106. Namely, in the state in which the photosensitive material 106 has moved by one step and stopped, the stepping motor 226 starts rotating to move the light source portion 204 on the photosensitive material 106 along the transverse direction of the photosensitive material 106. When the stepping motor 226 is rotated in the reverse direction after a predetermined number of pulses has been confirmed, the light source portion 204 returns to its original position. Subsequent movement of the photosensitive material 106 starts simultaneously with the returning motion of the light source portion 204.

A photodiode 228 is provided at the light emitting side in the light source portion 204 so as to face the photosensitive material 106 and outputs a signal corresponding to the quantity of light from the light source portion 204. The photodiode 228 is connected to a light-quantity correction unit 230 and the signal corresponding to the quantity of light is inputted to the light quantity correction unit 230.

The photodiode 228 detects light used for main scan and functions as a reference position at the time when the image signal is outputted.

Namely, the photodiode 228 is positioned outside an image recording region and is provided to receive light from the light source portion 204 prior to the image recording.

In the present embodiment, when the photodiode 228 detects light at the time of a first main scan, a pulse number of the stepping motor 226 is reset (0). Thereafter, the pulse number is used to control the drive of the stepping motor 226. For this reason, an output timing of the image signal in the second and subsequent main scans does not depend on the detection of light by the photodiode 228, and the image signal is outputted when the pulse number reaches a predetermined value.

The scan based on the control of the pulse number as described above is effected for each image, and at the start time of scan for the subsequent image, the pulse number is reset again at the time of detection of light by the photodiode 228.

The light-quantity correction unit 230 compares the respective quantities of light from the LED chips 208 of each of the detected colors to adjust density and color balance, and further outputs a correction value to the controller 202. The image signal to be transmitted to the light source portion 204 is corrected based on the correction value and each LED chip 208 is turned on with the proper quantity of light.

Figure 5:
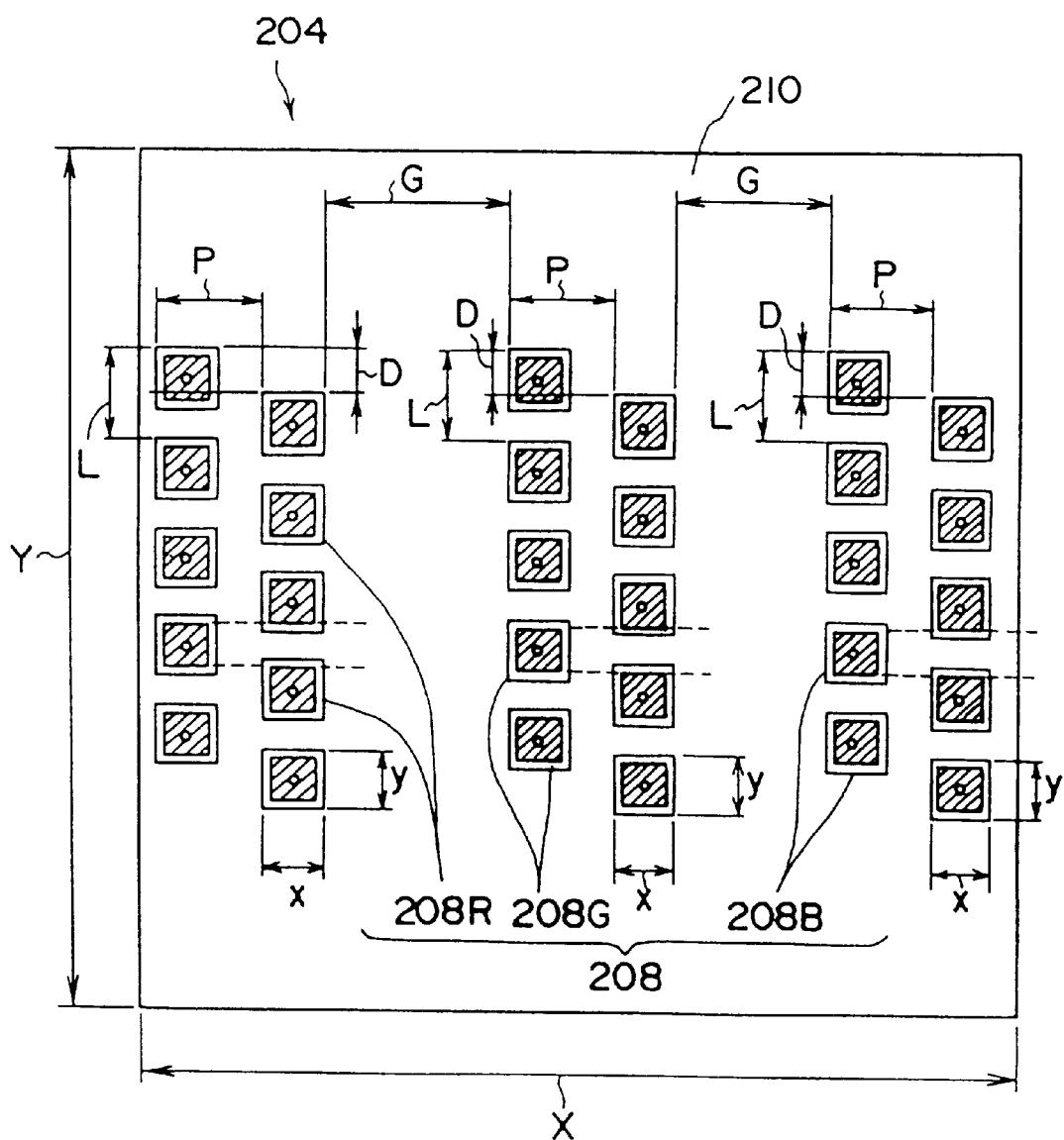
FIG. 5 is a plan view which shows a light source portion of an exposure section.

As shown in FIG. 5, the light source portion 204 is formed with the plurality of LED chips 208 being arranged in groups. A plurality of sets of LED chips 208, each set thereof emitting light in colors of blue (B), green (G), and R (red) (when described below for each of the colors, the LED chip which emits blue light is referred to as B-LED chip 208B, the LED chip which emits green light is referred to as G-LED chip 208G, and the LED chip which emits red light is referred to as R-LED chip 208R), are mounted onto a substrate 210 along the transverse direction of the photosensitive material 106 (i.e., the main scanning direction), each following the same stipulated layout. Meanwhile, the wavelength of light from the R-LED chip 208R is 650±20 nm, the wavelength of light from the G-LED chip 208G is 530±30 nm, and the wavelength of light from the B-LED chip 208B is 470±20 nm.

On the substrate 210 in the plan view shown in FIG. 5, ten B-LED chips 208B are arranged in two rows in a zigzag manner at the right edge, ten R-LED chips 208R are arranged in two rows in a zigzag manner at the left edge, and ten G-LED chips 208G are arranged in two rows in a zigzag manner in the center. Accordingly, the LED chips 208 are arranged in a total of six rows.

A predetermined wiring arrangement is provided on the substrate 210 by etching processing or the like and each wire is covered by metal for thermal radiation so as not to cause a short circuit between the wires. For this reason, generation of heat due to the LED chips 208 being turned on can be restricted, and variations in the amount of light emitted can also be limited.

The dimensions of respective parts of the light source portion 204 applied to the present embodiment are as follows.

The longitudinal and transverse dimensions (X, Y) of the substrate 210 are 5×5 mm (maximum) and the outer dimensions of each LED chip 208 (x×y) are about 360×360 $\mu$m. The row pitch P of the same color LED chips is 600 $\mu$m, the line pitch L of each row of the LED chips is 520 $\mu$m, and the distance D of a stepped portion formed in the zigzag arrangement along the longitudinal direction of the substrate is 260 μm. The distance G between LED chips for the adjacent two colors is determined by the telecentric lens 212, and therefore, it cannot be determined unconditionally. Preferably, the respective distances G between the R-LED chips 208R and the G-LED chips 208G, and between the G-LED chips 208G and the B-LED chips 208B are equal to each other.

The diagonal line section of each of the LED chips 208 shown in FIG. 5 is a region from which light is actually emitted. As shown in the dotted lines shown in FIG. 5, the borders of the light emission regions in the adjacent zigzag rows of LED chips are disposed so as to line up with each other.

The light source portion 204 having the above-described structure allows recording of ten main scanning lines by one main scan operation for each of the colors. For this reason, stepwise movement of the photosensitive material 106 is controlled such that the photosensitive material 106 is driven and stopped repeatedly at a pitch of ten times the width of a main scanning line to be recorded on the photosensitive material 106.

Reservoir Portion

The reservoir portion 170 is, as described above, disposed between the exposure section 176 and the water applying portion 178 and is formed by two pairs of nip rollers 192 and 194 and one dancer roller 196. The photosensitive material 106 is entrained between the two pairs of nip rollers 192 and 194 and a substantially U-shaped slack portion is formed in the photosensitive material 106 between these pairs of nip rollers. The dancer roller 196 moves up and down correspondingly to the amount of slack so as to maintain the amount of slack in the photosensitive material 106.

In the exposure section 176, the photosensitive material 106 is moved in a stepwise manner, but in the water applying portion 178, it is necessary that the photosensitive material 106 be conveyed at a fixed speed so as to allow uniform application of water onto the photosensitive material 106. For this reason, a difference in the conveying speed of the photosensitive material 106 is generated between the exposure section 176 and the water applying portion 178. In order to absorb the difference in the conveying speed, the dancer roller 196 moves up and down to adjust the amount of slack formed in the photosensitive material 106, so that the stepwise movement and the constant-speed movement of the photosensitive material 106 can be carried out simultaneously.

Next, operation of the present embodiment will be described.

The overall flow of an image recording operation will be first described.

In a state in which the tray 144 has been loaded into the tray loading aperture 146, and the feed reel 152 onto which the photosensitive material 106 has been completely taken up, and the take-up reel 154 which is in an empty state, have been mounted in their respective predetermined positions, and also when loading has been completed, then when the printing start key of the operation display portion 112 is operated, the controller 202 reads and stores image data from the optical disk 102 or the FD 104.

When the image data is stored in the controller 202, the feed reel 152 is driven to start conveying the photosensitive material 106.

When the photosensitive material 106 arrives at a predetermined position in the exposure section 176, the photosensitive material 106 is stopped temporarily and image signals are outputted from the controller 202 to the light source portion 204. The image signals are outputted every ten lines and the light source portion 204 is guided along the guide shaft 218 by the driving of the stepping motor 226 to move along the transverse direction of the photosensitive material 106 (main scan). Prior to the outputting of the image signals, the amount of light for each of the colors from the light source portion 204 is detected by the photodiode 228, and in the light-amount correction unit 230, a correction value for adjustment of the density, color balance, and the like is supplied to the controller 202, to thereby correct the image signal. This correction of the image signal is made for each image.

When the first main scan is completed, the photosensitive material 106 is moved by one step (10-line pitch) and stops, and subsequently, the second main scan is effected. By repeating the above main scan, an image of one frame is recorded on the photosensitive material 106. The photosensitive material 106 on which the image has been recorded is held by the drive of the upstream side nip roller pair 192 only in the reservoir portion 170 (the downstream side nip roller pair 194 is stopped), in a state of having a slack portion in the reservoir portion 170 able to be entrained onto the dancer roller 196. For this reason, the above photosensitive material 106 is disposed so as not to reach the water applying portion 178.

When the photosensitive material 106 having a length of one image is accumulated in the reservoir portion 170, the nip roller pair 194 on the downstream side of the reservoir portion 170 starts driving. As a result, the photosensitive material 106 (with images having been recorded thereon) is conveyed to the water applying portion 178. In the water applying portion 178, the photosensitive material 106 is conveyed at a constant speed and water is uniformly applied to the photosensitive material by the applying member 188.

Water is constantly conveyed from the tank 190 to the applying member 188 and the photosensitive material 106 is pressed by the applying member 188 at a predetermined pressure. For this reason, the proper amount of water is applied to the photosensitive material 106.

The photosensitive material 106 to which water is applied is guided by the guide plate 172 and is conveyed to the third roller pair 166.

On the other hand, the peripheral surface of the semicircular roller 156 and the leading end of the image receiving paper 108 are made to contact each other by one rotation of the semicircular roller 156, and the uppermost sheet of the image receiving paper stack 108 is pulled out and nipped by the first roller pair 160. The image receiving paper 108 is pulled out from the tray 144 by being driven by the first roller pair 160 and waits for the arrival of the photosensitive material 106 in a state of being nipped by the second roller pair 162.

Synchronously with the passing of the photosensitive material 106 through the guide plate, the first roller pair 160 and the second roller pair 162 start driving and the image receiving paper 108 is guided by the guide plate 164 and conveyed to the third roller pair 166.

The photosensitive material 106 and the image receiving paper 108 are nipped by the third roller pair 166 in a laminated state and are conveyed to the heat roller 174. At this time, the photosensitive material 106 and the image receiving paper 108 closely contact each other due to the water applied to the photosensitive material 106.

The photosensitive material 106 and the image receiving paper 108 in a laminated state are entrained onto the heat roller 174 and are subjected to heat from the heater 182 for heat development-transfer processing. In other words, the image recorded on the photosensitive material 106 is transferred onto the image receiving paper 108 so as to form an image on the image receiving paper 108.

The heat development-transfer processing is completed with the image receiving paper 108 in a state of being wound onto the heat roller 174 by a length of about one third the total circumference of the roller, and subsequently, the image receiving paper 108 is separated from the photosensitive material 106 by the peeling roller 184 and the peeling claw 186, and is entrained by the peeling roller 184 to be discharged onto the discharge tray 140.

On the other hand, the photosensitive material 106 is wound onto the heat roller 174 by a length of about a half the overall circumference of the roller, and thereafter, the photosensitive material 106 moves in the tangential direction and is wound onto the take-up reel 154.

Figure 6:
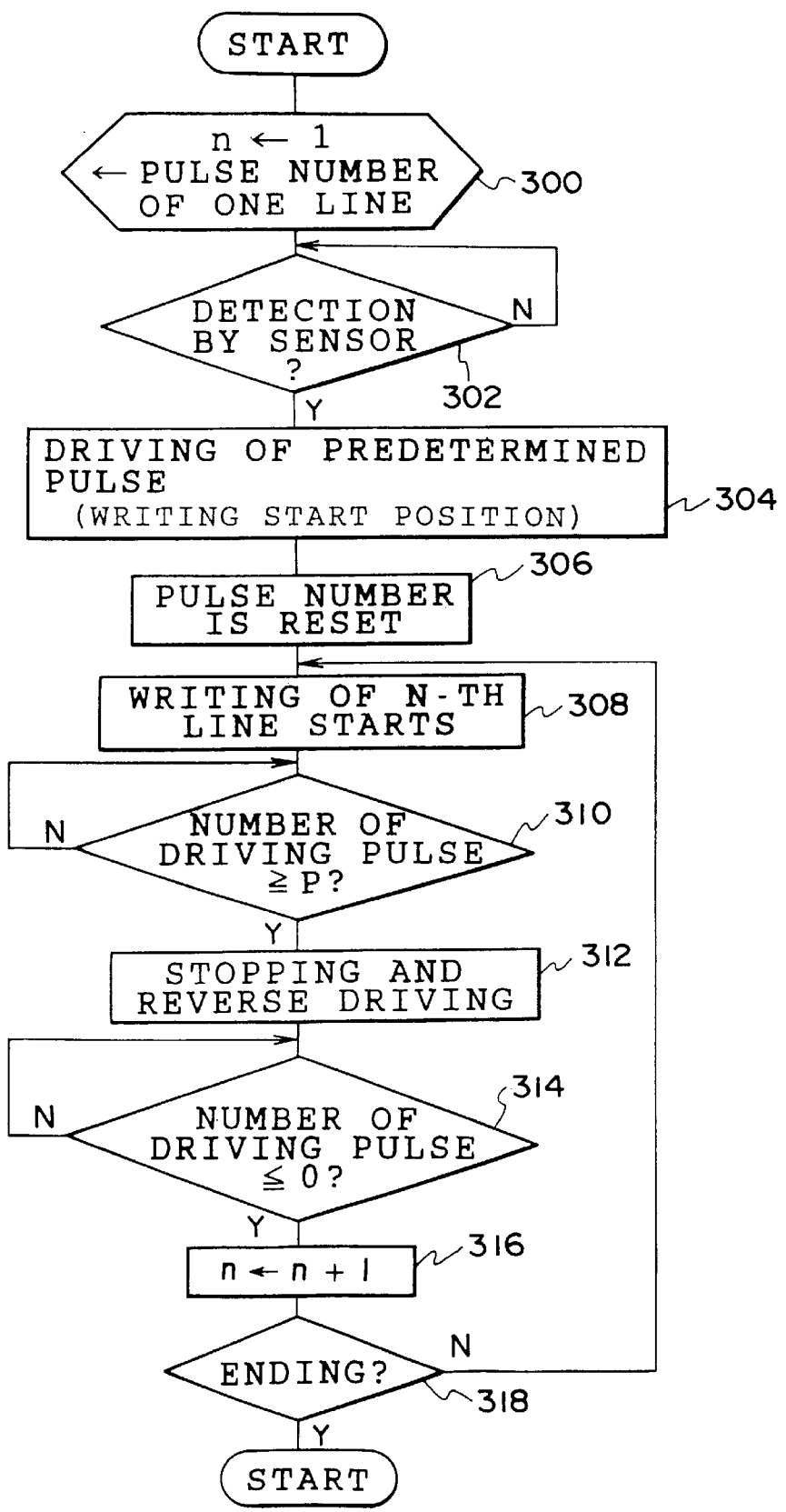
FIG. 6 is a flow chart which shows a routine for controlling a main scan start timing of one image portion.

Here, an image signal output timing at the time of main scan in the present embodiment is the time of detection of light by the photodiode 228 in the first main scan operation. In the second and subsequent main scan operations, the image signal output timing is set based on the control of the pulse number of the stepping motor 226. The control of the main scan will be hereinafter described in detail with reference to the flow chart shown in FIG. 6.

First, in step 300, a variable, n, which shows the number of lines is set at 1 and the pulse number for one line (i.e., the pulse number of the width corresponding to an image region) is set at P.

In step 302, it is determined whether light is detected by the photodiode 228. When the decision of step 302 is yes, the process proceeds to step 304 and the stepping motor 226 is driven in predetermined pulse numbers. The predetermined pulse numbers are the pulse numbers which correspond to a length from the position where light is detected by the photodiode 228 to the position where image recording starts.

In step 306, the pulse number of the stepping motor 226 is reset (0). In the subsequent step 308, writing of the n-th main scan (in the first main scan) starts. In the present embodiment, ten lines are written simultaneously and the simultaneous writing is referred to as "lines scanned at one time".

In step 310, it is determined whether the number of driving pulses reaches P. When the decision of step 310 is yes, the process proceeds to step 312 and driving of the stepping motor 226 stops and the stepping motor 226 is driven in the reverse direction. Meanwhile, during the reverse driving of the stepping motor 226, the photosensitive material 106 is moved by one step.

In step 314, it is determined whether the number of driving pulse is set at 0. When the decision of step 314 is yes, the process proceeds to step 316, in which the number of lines, n, is incremented, and the process further proceeds to step 318. In step 318, it is determined whether writing of the final line has been completed. When the decision of step 318 is no, the process returns to step 308 and the above-described process is repeated. Further, when the decision of step 318 is yes, it is determined that processing for one image has been completed and the routine ends.

As described above, with the detection of light by the photodiode 228 only in the first main scan of one image as a reference, subsequent image recording processing is carried out by controlling the stepping motor 226 with the pulse number. For this reason, image recording with high accuracy can be effected without depending on errors in the detection of light by the photodiode 228.

Further, in the present embodiment, image recording is effected based on the driving pulse for the stepping motor 226. However, a pulse prior to dividing, which is inputted to a driving pulse generator which generates the driving pulse for the stepping motor 226 (for example, a clock pulse, a horizontal synchronizing pulse or a vertical synchronizing pulse when an original image is a video signal and a regenerator therefor, or the like, is connected thereto) may be used to detect an amount of movement of the light source portion 204.

Moreover, in the present embodiment, an image exposure start timing and the driving pulse used to determine the amount of movement of the light source portion 204 are not particularly correlated with each other for each main scanning. However, with the exposure timing synchronized with the driving pulse or "n" times or 1/n time (n is an integer) the pulse prior to dividing, the writing start time in each main scan can be made coincident with each other with high accuracy.

Meanwhile, the above-described control by using the pulse number allows not only one-way scan, but also reciprocating scan. Further, the reciprocating scan allows high-speed image recording, but causes deterioration of the image quality. However, the control by using the pulse number used in the present embodiment causes no deterioration of the image quality.

According to the present embodiment, image recording can be effected with a compact structure, and further, rapid capture of image data can be achieved owing to the optical disk deck 124 and the FD deck 126 being mounted within the apparatus. Moreover, the image to be recorded can be confirmed by the monitor portion 114, thereby facilitating adjustment of density and color balance.

Further, the discharge tray 140 is able to be accommodated inside the apparatus. Therefore, when the apparatus is not in use, by removing the tray 140 having the image receiving papers 108 accommodated therein, the external shape of the apparatus can be made to have fewer projecting portions. As a result, a working space can be effectively utilized.

In addition, in the apparatus according to the present embodiment, the water applying portion 178 and the exposure section 176 are disposed fixedly with respect to the direction in which the photosensitive material 106 is conveyed. Further, relative movement of the apparatus with respect to the photosensitive material 106 is entirely achieved by movement of the photosensitive material 106, and therefore, the moving mechanism becomes simple.

In addition, the present embodiment is provided so that the optical disk deck portion 124 and the FD deck portion 126 are loaded in the apparatus, but a deck portion in which other recording medium (for example, a photo-magnetic disk (MO), a phase-change disk (PD), a video tape, and the like) can be loaded may also be provided. Further, an image input terminal which is used to take in an image signal from outside (for example, a personal computer, a television, and the like) can also be provided.

Next, a second embodiment of the present invention will be described. It should be noted that the same numerals as those of the first embodiment will be denoted by the same reference numerals, and a description thereof will be omitted.

Figure 7:
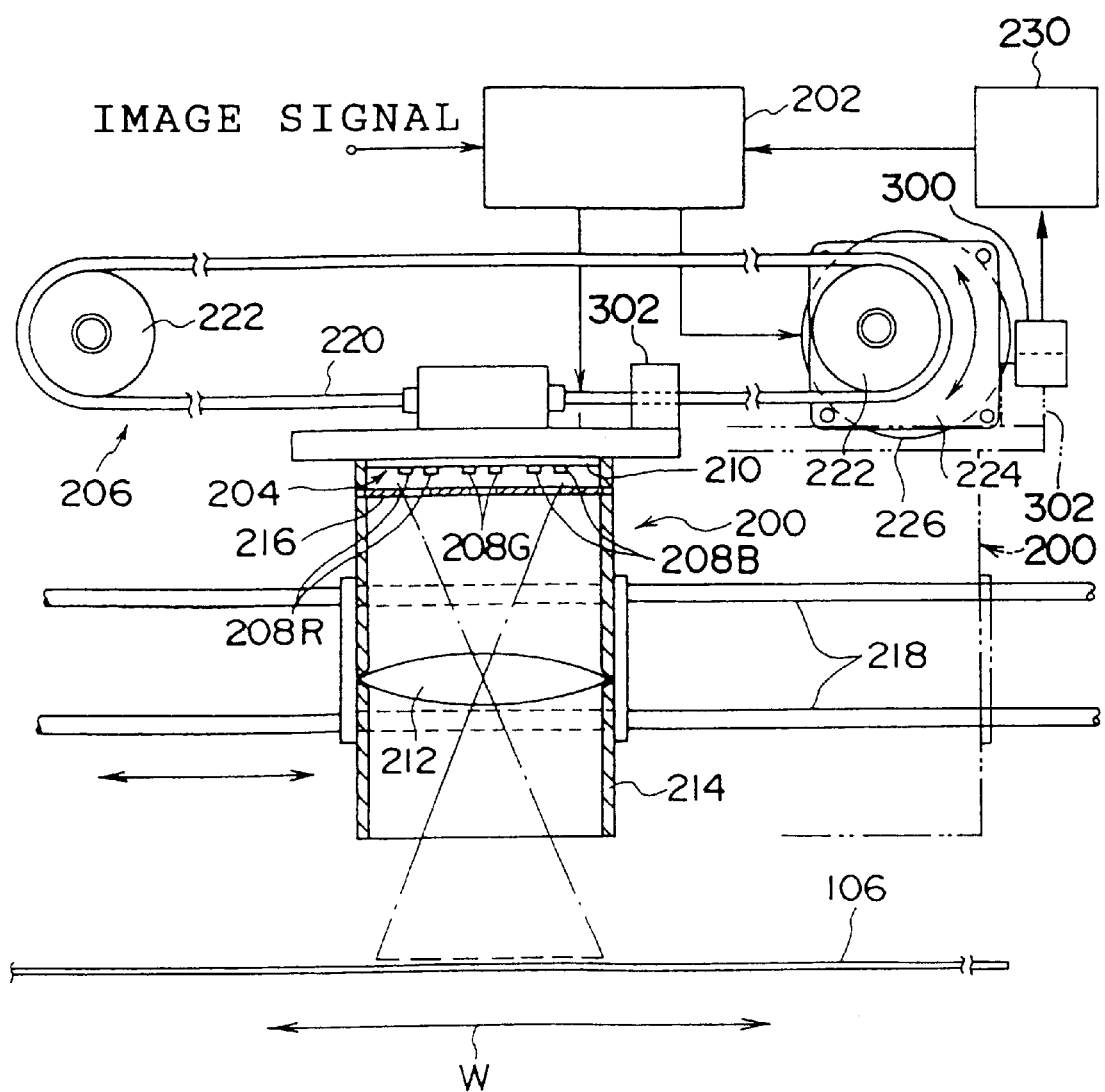
FIG. 7 is a schematic front view which shows an exposure section according to a second embodiment of the present invention.

As shown in FIG. 7, the second embodiment is mainly characterized by that in place of the photodiode 228 which detects the timing at which the pulse number of the stepping motor 226 is reset (0), a photo-interrupter 300 is disposed, as main scan means, on the locus of movement of the light source unit 200.

As shown in FIG. 7, a thin-walled plate 302 is mounted at a rack of the light source unit 200 and the photo-interrupter 300 is provided at a position at which the light source unit 200 is detected. The photo-interrupter 300 has a clearance between a light emitting portion and a light receiving portion and the clearance becomes a part of the locus of movement of the light source unit 200. Accordingly, when the light source unit 200 reaches a predetermined position (a reference position), the thin-walled plate 302 interrupts light from the light emitting portion and output of the photo-interrupter 300 can be reversed. With the pulse number for driving the stepping motor 226 being reset based on the reversed signal, the start position can reliably be obtained in the same way as in the first embodiment. Meanwhile, the reference position is set by the photo-interrupter 300 only in the first main scan of one image, and the subsequent main scan operations are each effected based on the pulse number in the same way as in the first embodiment.

In the foregoing, a non-contact sensor such as the photo-interrupter 300 is used as the main scan means-initial position detecting sensor. However, as the non-contact sensor, a Hall element or the like can be applied. Further, it suffices that a limit switch or the like may be disposed, as a contact-type sensor, at a predetermined position on the locus of movement of the light source unit 200.

Further, in this embodiment, eleven LED chips are arranged for each of the colors of the light source portion 204.

Figure 8:
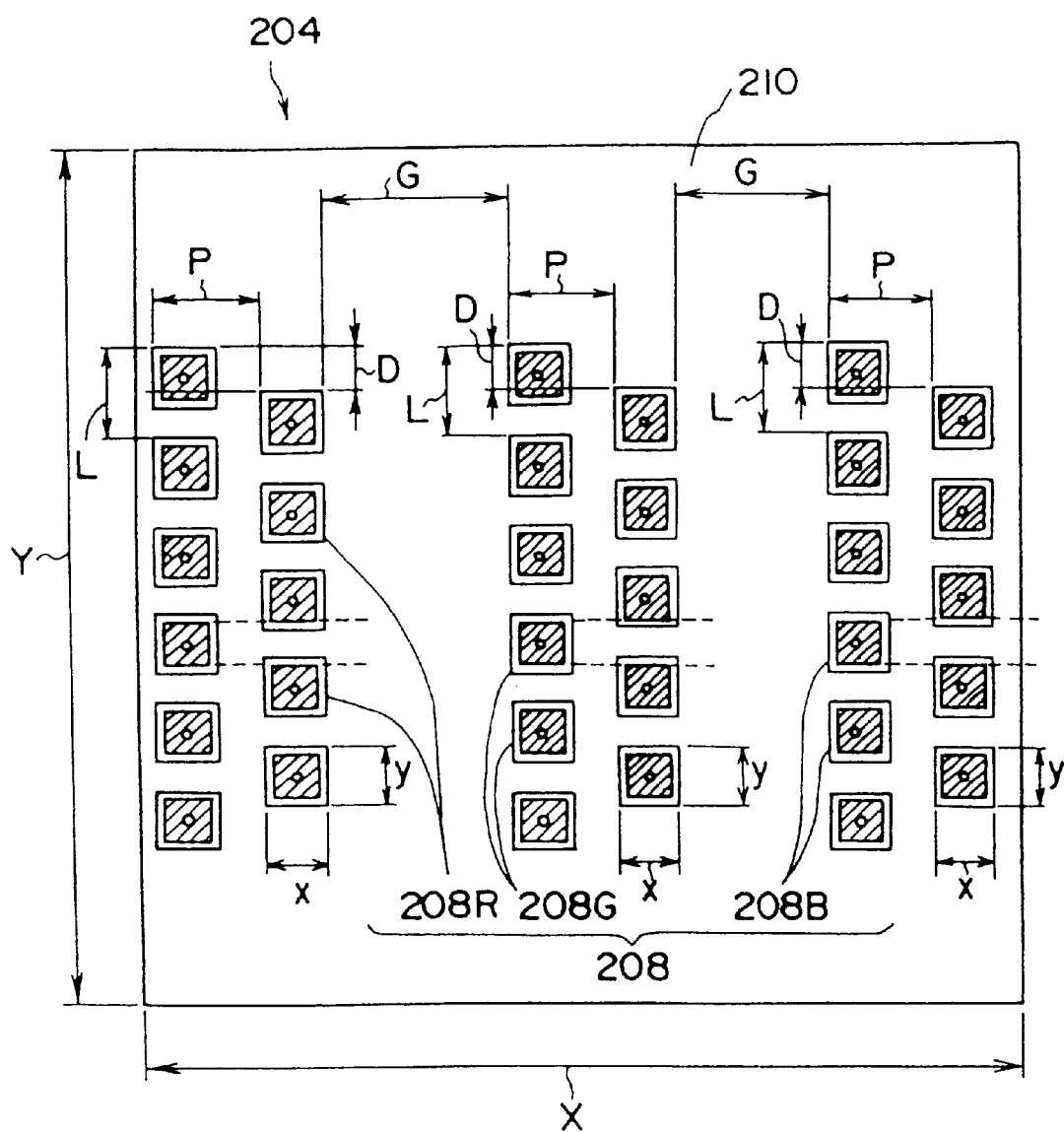
FIG. 8 is a plan view which shows a light source portion according to the second embodiment of the present invention.

As shown in FIG. 8, the light source portion 204 is formed with the plurality of LED chips 208 being arranged in groups. A plurality of sets of LED chips 208, each set thereof emitting light in colors of blue (B), green (G), and R (red) (when described below for each of the colors, the LED chip which emits blue light is referred to as B-LED chip 208B, the LED chip which emits green light is referred to as G-LED chip 208G, and the LED chip which emits red light is referred to as R-LED chip 208R), are mounted onto a substrate 210 along the transverse direction of the photo-sensitive material 106 (i.e., the main scanning direction), each following the same stipulated layout. Namely, on the substrate 210 in the plan view shown in FIG. 5, eleven B-LED chips 208B are arranged in two rows in a zigzag manner at the right edge, eleven R-LED chips 208R are arranged in two rows in a zigzag manner at the left edge, and eleven G-LED chips 208G are arranged in two rows in a zigzag manner in the center. Accordingly, the LED chips 208 are arranged in a total of six rows.

A predetermined wiring arrangement is provided on the substrate 210 by etching processing or the like and each wire is covered by metal for thermal radiation so as not to cause a short circuit between the wires. For this reason, generation of heat due to the LED chips 208 being turned on can be restricted, and variations in the amount of light emitted can also be limited. Meanwhile, the dimensions of each LED chip 208 (x×y) are about 360×360μm.

The row pitch P of the same color LED chips to be mounted on the substrate 210 is 600 μm, the line pitch L of each row of the LED chips is 520 μm, and the distance D of a stepped portion formed in the zigzag arrangement along the vertical direction of the substrate is 260 μm. The respective distances G between the R-LED chips 208R and the G-LED chips 208G, and between the G-LED chips 208G and the B-LED chips 208B are preferably equal to each other. The diagonal line section of each of the LED chips 208 shown in FIG. 5 is a region from which light is actually emitted, and the borders of the light emission regions in the adjacent zigzag rows of LED chips are disposed so as to line up with each other.

In the light source portion 204 having the above-described structure, eleven main scanning lines can be recorded on the photosensitive material 106 in one main scanning operation for each of the colors. The main scanning line pitch numbers are ten (an even number).

In the present embodiment, the stepwise movement of the photosensitive material 106 is controlled so that sub-scan driving and stopping are repeated at a pitch (5.5-line pitch) in which the first main scanning line recorded on the photosensitive material 106 comes to an intermediate position between the sixth and seventh main scanning lines in the previous main scanning operation. In FIG. 9, solid thin lines indicate main scanning lines formed by the previous main scanning operation, broken lines indicate main scanning lines formed by the current main scanning operation, and solid thick lines indicate main scanning lines formed by the next main scanning operation.

As described above, the number of the LED chips 208 are set at an odd number (namely, the pitch numbers are ten) and a main scanning line is additionally formed between the main scanning lines so as to double the resolution. Further, with the number of LED chips 208 being set at an odd number, the subscan pitch can be made uniform. Further, scanning lines are not written between two adjacent scanning lines from the first to fifth main scanning lines during the first main scan driving owing to system control.

As described above, the image exposure apparatus according to the present invention has an excellent effect in that inconsistency of the start time of each main scan can be eliminated which is caused by a variation in the time of detection by a sensor for controlling a scan start timing.

What is claimed is:

1. An image exposure apparatus which controls emission of a light beam from a light source based on an image data signal to record an image on a photosensitive material by scanning the light beam, comprising:

main scan means which moves the light source with respect to the photosensitive material in a predetermined main scanning direction;

sub-scan means which moves relatively the light source and the photosensitive material in a direction perpendicular to the main scanning direction for each main scan effected by said main scan means;

a detecting sensor which detects a start position of said main scan means;

moving a mount detecting means which detects an amount by which the light source is moved in the main scanning direction; and main scan exposure control means which controls an exposure start timing of a light beam in each of the second and subsequent main scan operations until the first main scan operation for scan recording starts, with reference to a detected value of an amount of movement detected by said moving amount detecting means when the start position of said main scan means is detected by said detecting sensor.

2. An image exposure apparatus according to claim 1, wherein said detecting sensor is a start-position detecting sensor which detects a light beam from the light source at a predetermined position.

3. An image exposure apparatus according to claim 1, wherein said detecting sensor is a main scan means-initial position detecting sensor which detects said main scan means at a predetermined position.

4. An image exposure apparatus according to claim 1, wherein the main scan driving is effected by a stepping motor and a driving pulse for the stepping motor or a pulse prior to dividing, which is inputted to a stepping motor driving pulse generator, is used to detect the amount of movement of the light source.

5. An image exposure apparatus according to claim 2, wherein the main scan driving is effected by a stepping motor and a driving pulse for the stepping motor or a pulse prior to dividing, which is inputted to a stepping motor driving pulse generator, is used to detect the amount of movement of the light source.

6. An image exposure apparatus according to claim 3, wherein the main scan driving is effected by a stepping motor and a driving pulse for the stepping motor or a pulse prior to dividing, which is inputted to a stepping motor driving pulse generator, is used to detect the amount of movement of the light source.

7. An image exposure apparatus according to claim 4, wherein an exposure start timing for one dot of an image is synchronized with a driving pulse for the stepping motor or n times or 1/n (n is an integer) the pulse prior to dividing.

8. An image exposure apparatus according to claim 5, wherein an exposure start timing for one dot of an image is synchronized with a driving pulse for the stepping motor or n times or 1/n (n is an integer) the pulse prior to dividing.

9. An image exposure apparatus according to claim 6, wherein an exposure start timing for one dot of an image is synchronized with a driving pulse of the stepping motor or n times or 1/n (n is an integer) the pulse prior to dividing.

10. An image exposure apparatus according to claim 7, wherein the light source comprises three groups of light emitting diodes, which emit light of blue, green, and red.

11. An image exposure apparatus according to claim 8, wherein the light source comprises three groups of light emitting diodes, which emit light of blue, green, and red.

12. An image exposure apparatus according to claim 9, wherein the light source comprises three groups of light emitting diodes, which emit light of blue, green, and red.

13. An image exposure apparatus according to claim 10, wherein the photosensitive material is a full-color photosensitive material and a heat development-transfer mechanism is provided in which after scan and exposure processing for the full-color photosensitive material with the plurality of groups of light emitting diodes used, a latent image formed on the full-color photosensitive material is subjected to heat development in a state of the full-color photosensitive material overlapping with an image receiving paper, and the image is transferred to the image receiving paper.

14. An image exposure apparatus according to claim 11, wherein the photosensitive material is a full-color photosensitive material and a heat development-transfer mechanism is provided in which after scan and exposure processing for the full-color photosensitive material with the plurality of groups of light emitting diodes used, a latent image formed on the full-color photosensitive material is subjected to heat development in a state of the full-color photosensitive material overlapping with an image receiving paper, and the image is transferred to the image receiving paper.

15. An image exposure apparatus according to claim 12, wherein the photosensitive material is a full-color photosensitive material and a heat development-transfer mechanism is provided in which after scan and exposure processing for the full-color photosensitive material with the plurality of groups of light emitting diodes used, a latent image formed on the full-color photosensitive material is subjected to heat development in a state of the full-color photosensitive material overlapping with an image receiving paper, and the image is transferred to the image receiving paper.

16. An image exposure apparatus according to claim 13, wherein a peeling mechanism which separates the photosensitive material and the image receiving paper from each other is disposed at a downstream side of the heat development-transfer mechanism in a direction in which the photosensitive material is conveyed.

17. An image exposure apparatus according to claim 14, wherein a peeling mechanism which separates the photosensitive material and the image receiving paper from each other is disposed at a downstream side of the heat development-transfer mechanism in a direction in which the photosensitive material is conveyed.

18. An image exposure apparatus according to claim 15, wherein a peeling mechanism which separates the photosensitive material and the image receiving paper from each other is disposed at a downstream side of the heat development-transfer mechanism in a direction in which the photosensitive material is conveyed.

* * * * *